Dec. 24, 1940.  A. C. DE HOFFMANN  2,226,159
REFLECTOR SIGNAL DEVICE
Filed Sept. 21, 1937  3 Sheets-Sheet 1
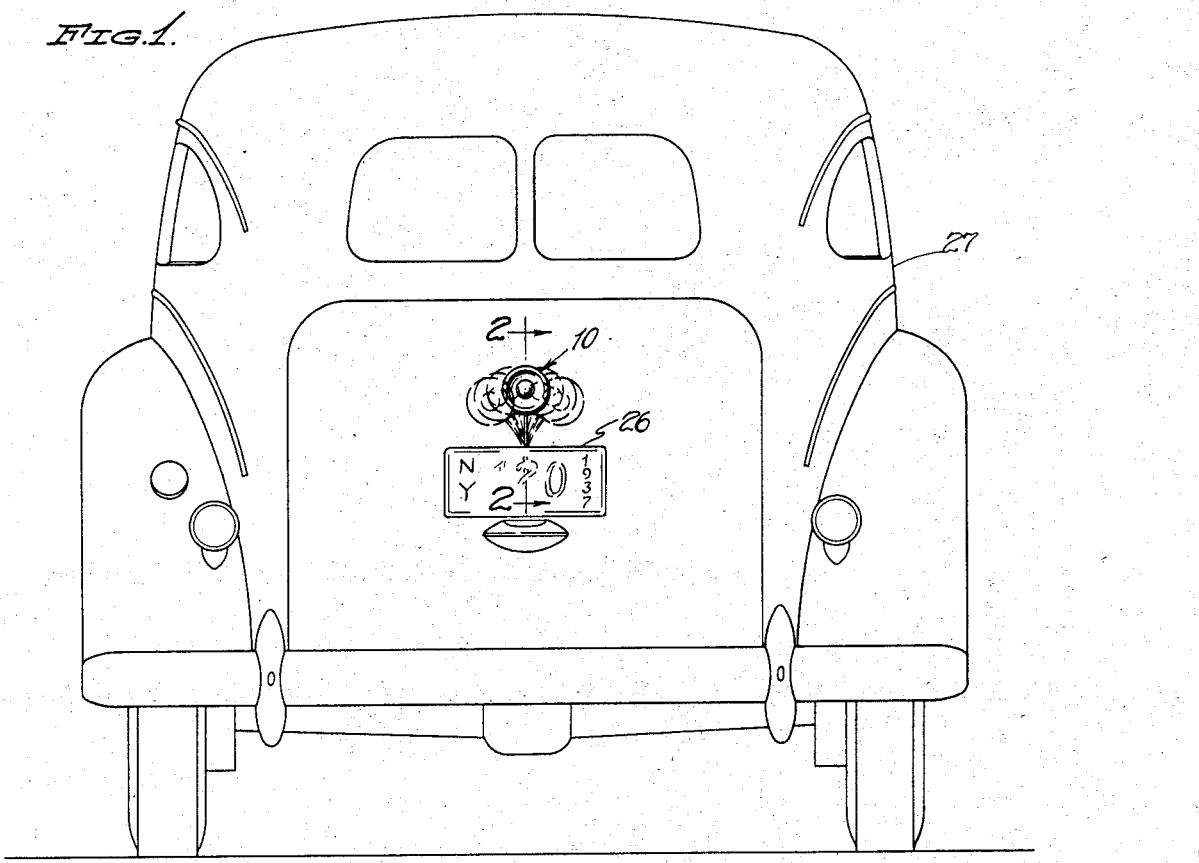
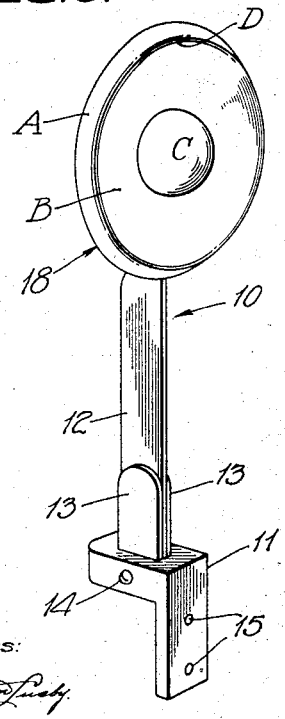
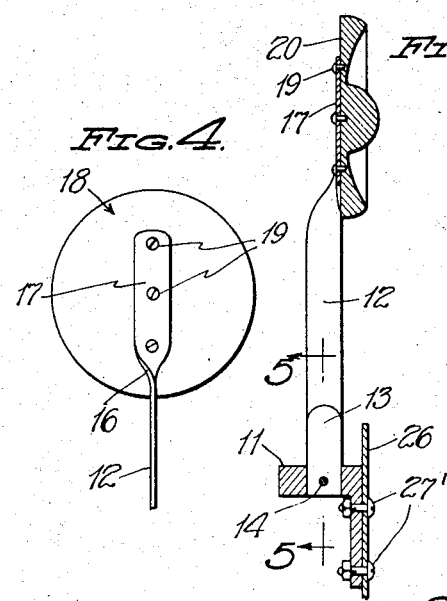
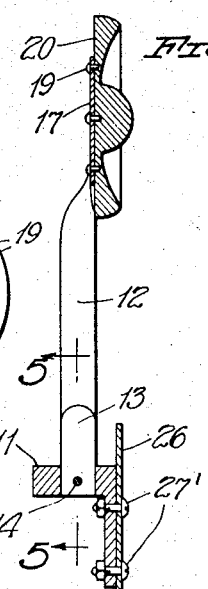
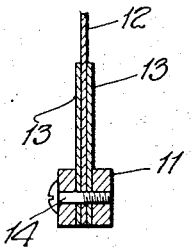
ALEXANDER C. de HOFFMANN.
INVENTOR.
BY Ely & Pattison
ATTORNEYS.
WITNESS:

Dec. 24, 1940.  A. C. DE HOFFMANN  2,226,159
REFLECTOR SIGNAL DEVICE
Filed Sept. 21, 1937   3 Sheets-Sheet 2
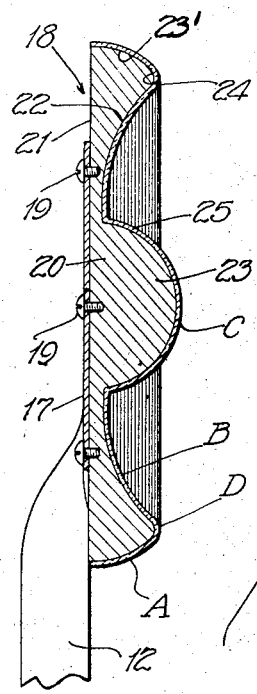
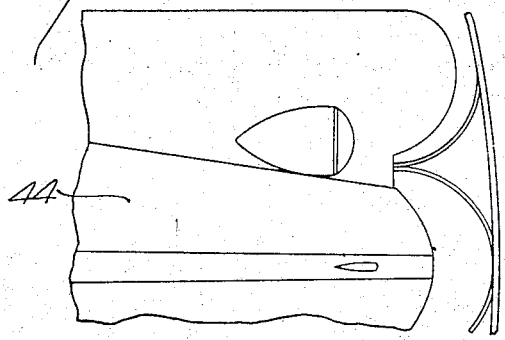
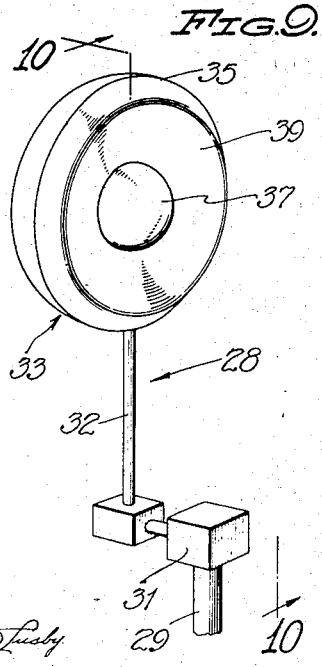
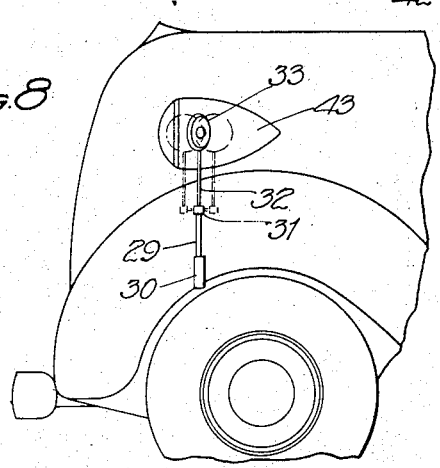
ALEXANDER C. de HOFFMANN.
INVENTOR.
BY Ely & Pattison.
ATTORNEYS.

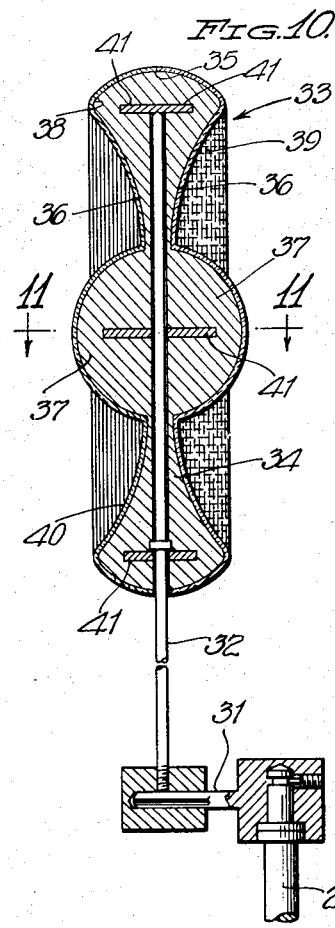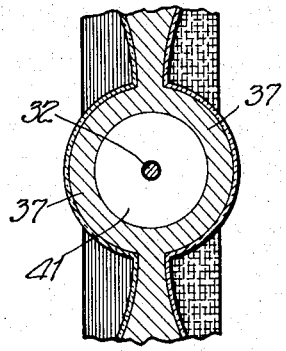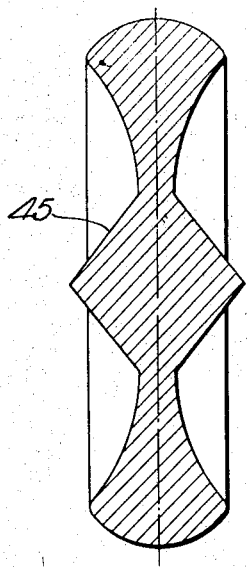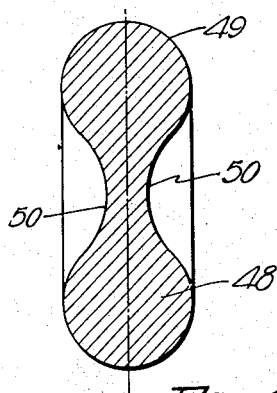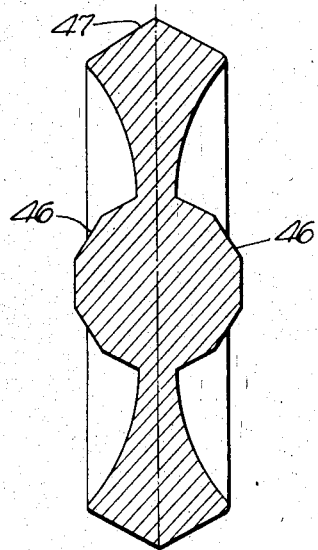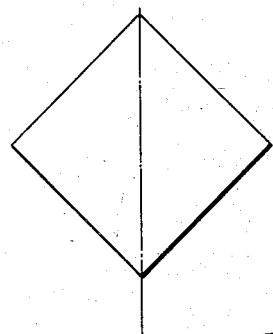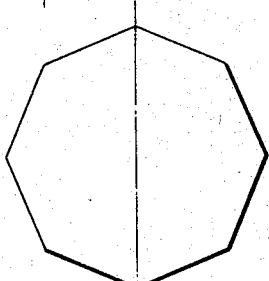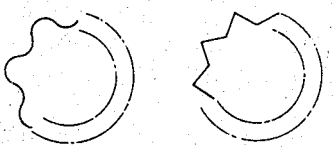

Patented Dec. 24, 1940

2,226,159

UNITED STATES PATENT OFFICE 2,226,159

REFLECTOR SIGNAL DEVICE

Alexander C. de Hoffmann, New York, N. Y.

Application September 21, 1937, Serial No. 164,849

2 Claims. (Cl. 88—81)

This invention relates to improvements in safety signal devices for motor vehicles, and more particularly to a reflector signal device especially adaptable for safe driving at night.

One of the several features of the invention resides in a reflector signal device which when positioned upon an automobile, receives the light rays from the headlights of approaching vehicles regardless of the angle of approach to reflect a colored light to warn the driver of the approaching vehicle of the presence of the danger which may be in his path.

A further feature of the invention is the provision of a safety reflector signal device which may be mounted upon the forward left side of a motor vehicle to receive the rays of the headlights of a forwardly approaching vehicle to reflect colored rays of light to visibly indicate a line of demarkation between the paths of the two vehicles to enable the driver of the forwardly approaching vehicle to gauge a safe distance between the two vehicles when they are abreast of each other.

A further feature of the invention resides in a reflector signal device which is novel in construction, inexpensive of manufacture, easy to position upon an automobile, and which is efficient in operation.

Other features of the invention will appear as the following specification is read in conjunction with the accompanying drawings, in which:

Figure 1 is a rear elevational view of an automobile with the rear reflector signal mounted thereon, the dotted lines indicating the oscillatory action of the reflector.

Figure 2 is an enlarged detail vertical sectional view on the line 2—2 of Figure 1.

Figure 3 is a perspective view of a rear signal device per se.

Figure 4 is a fragmentary rear elevational view.

Figure 5 is a detail vertical sectional view on the line 5—5 of Figure 2.

Figure 6 is an enlarged vertical sectional view through the reflector signal element.

Figure 7 is a top plan view of the front portions of a pair of passing automobiles, one of which is equipped with a front safety reflector signal device.

Figure 8 is a fragmentary side elevational view of an automobile equipped with the front reflector signal device.

Figure 9 is a perspective view of the front reflector signal device per se.

Figure 10 is an enlarged vertical sectional view on the line 10—10 of Figure 9.

Figure 11 is a horizontal sectional view on the line 11—11 of Figure 10.

Figures 12 to 14, inclusive, are vertical sectional views illustrating the various cross sectional shapes which may be embodied in the reflector signal element.

Figures 15 to 19, inclusive, are front elevational views illustrating the different peripheral shapes which may be embodied in the reflector signal element.

Referring to the drawings by reference characters, and at present to the rear reflector signal device shown in Figures 1 to 6, inclusive, the numeral 10 designates the rear reflector signal device in its entirety. The reflector signal device 10 includes an inverted L-shaped attaching bracket 11, and fixedly secured to the horizontal arm of the bracket 11 and rising upwardly therefrom is a flat spring 12. Buffer springs 13—13 fit against opposite flat sides of the spring 12 adjacent the lower end thereof and the buffer springs and lower end of the spring 12 are held in the bracket by a fastening screw 14. The vertical arm of the bracket 11 is provided with bolt openings 15 to facilitate the passage of fastening bolts presently to be described. Inwardly of the top end of the spring 12, the same is formed with a twist 16 in order to provide a reflector attaching portion 17, the said portion 17 being disposed at right angles to the remaining portion of the spring 12. Fixedly secured to the attaching portion 17 is a reflector signal element 18, the said element being secured to the portion 17 by fastening screws 19.

The reflector signal member 18 is shown enlarged, in Figure 6 of the drawings, and includes a circular disk like body 20 of any molded composition material. The rear side 21 of the body 20 is flat and fits against the attaching portion 17 of the spring 12 whereas the front side of the body 20 is provided with a concavity 22 and within which is formed a semi-circular dome shaped or convex portion 23 which extends beyond the plane of the front side of the periphery of the body 20. The peripheral edge of the body 20 is forwardly curved as at 23' and the meeting edges between the concavity 22 and the curved edge 23 is rounded as at 24.

Covering the concave and convex surfaces of the front side of the body 20 and the peripheral curved edge 23' is a glass or other like colored reflecting substance 25. Whereas the color "red" is preferable in view of its general significance to indicate "danger," the reflecting material may be of other colors such as yellow, green or the like. The reflecting substance 25 is continuous over the front side and peripheral edge of the body 20 and conforms to the curved surfaces thereof to provide a peripheral reflecting surface A, a concaved reflecting surface B, a centrally convexed reflecting surface C, and a rounded edge reflecting surface D. By providing this multiplicity of irregularly curved reflecting surfaces, it will be seen that at night any beam of light striking the front or the peripheral edges of the reflector signal element 18 will be picked up by the reflecting surfaces and colored rays of light reflected therefrom. By reason of the concave and convex reflecting surfaces, it will be understood that light rays picked up thereby will be reflected from one to the other, and at night the reflector element with a beam of light projected thereon will appear in the nature of a solid red disk.

In Figure 1 of the drawings, I have illustrated the rear reflector signal device 10 as being mounted on the rear license plate 26 of an automobile 27, although if desired, the device 10 may be mounted on the rear left fender, the rear bumper bar, or any other suitable part of the automobile. The vertical arm of the bracket 11 fits against the rear side of the license plate 26 and fastening bolts 27' pass through openings in the license plate and through the openings 15 in the bracket 11 to rigidly fasten the attaching bracket to the license plate.

By reason of the construction of the rear reflector signal device 10, and its attachment to the rear of the automobile 27, it will be seen that vibration of the automobile when in motion will be transmitted to the spring 12 which causes the same to flex and impart an oscillatory movement to the reflector element 18. Also, when the automobile is being brought to a stop, the inertia of the automobile at such time imparts a flexing action to the spring 12, which in turn oscillates the reflector element 18. It is understood of course that the spring 12 flexes transversely of the automobile and during rapid oscillation of the signal element 18, the said reflector element traverses an arc substantially shown in dotted lines in Figure 1. At night, with a beam of light from an automobile of a rearwardly approaching vehicle, the oscillatory movement of the reflector signal member 18 imparts an illusion to the driver of the approaching vehicle for instead of the reflector signal element appearing as a round disk, there appears an arcuate streak of red light, which will more readily attract the attention of the driver of a rearwardly approaching automobile, than merely a red tail light or the conventional signal light.

In Figures 7 to 11, inclusive, I have embodied the same principle of reflector element for use in connection with a front signal device, and which front signal device is designated in its entirety by the numeral 28. The device 28 includes an upstanding rod 29 having fender attaching means 30 at the lower end thereof, while rotatably supported at the top end of the rod 29 is a crank arm 31. Fixedly supported by the outer end of the horizontally disposed crank arm 31, and rising upwardly therefrom is a rod 32 which rotatably supports a reflector signal element designated in its entirety by the numeral 33.

The reflector element 33 in cross section, resembles in appearance, two reflector elements 18 placed back to back and includes a circular disk like body 34 of any desired composition of material, the periphery of which is convexly curved as at 35. Opposite sides of the body 34 are formed with concavities 36 and with centrally disposed convex portions 37, the edges between the concave portions 36 and the convex periphery 35 being rounded as at 38. One side of the body 34 and half of the peripheral edge 35 are covered with a yellow or amber reflecting material 39, while the opposite side and the remaining half of the peripheral edge are covered by a red reflecting substance 40. By providing distinguishing colored reflecting surfaces on opposite sides of the reflector element 33, it will be seen that if the element 33 is in rotation about the axis of the rod 32 and light rays are picked up by the element 33 at night, varied colored lights will be reflected from the reflector element 33. The concave and convex reflecting surfaces which are present on the reflector element 33 function the same as those of the element 18 previously described.

Whereas the reflector element 33 may be rotatably mounted upon the rod 32 in various manners, I have illustrated in Figure 10, bearing plates 41 embedded in the body 34, the said body having a vertical bore extending inwardly from the bottom to receive the upper end of the rod 32.

In Figure 7 of the drawings, I have illustrated the front reflector signal device 28 as being mounted on the front left fender of an automobile 42, the same being on substantially the same horizontal plane as the front headlight 43 of the automobile 42. Also in Figure 7, there is shown a fragmentary portion of an automobile 44 which is nearly abreast of the automobile 42, and it will be understood that the rays of light from the headlights of the vehicle 44 may be picked up by the reflector element 33 of the device 28 and when the reflector element 33 is in rotation due to air currents or winds by reason of the forward movement of the automobile 42, various colored rays of light will be reflected from the element 33. These colored rays of light are visible to the eyes of the driver of the approaching vehicle and indicate a safety gauge to enable the driver of the approaching vehicle to safely pass the vehicle 42 as the two automobiles are abreast of each other. The colored lights thrown off by the reflector element 33 serve as a guage or as a line of demarkation between two passing vehicles when the vision of the drivers of the vehicles may be "blinded" by the rays of approaching headlights.

Whereas the wind or air current is relied upon to impart rotation to the reflector element 33, there are times such as when the vehicle is turning a corner that the air currents may not be capable of rotating the reflector element 33 about the shaft 32. In such instances, the inertia of an automobile during turning of a corner actuates the crank arm 31, thus causing the reflector element 33 to revolve about the axis of rotation of the crank arm 31.

In Figure 12 of the drawings, I have illustrated a reflector body identical to the body 34 with the exception that the central portion of the body at opposite sides may be provided with flat reflecting surfaces 45 instead of the convexly curved surfaces 37.

In Figure 13 the central portion of the reflector body may be formed with a multiplicity of flat reflecting surfaces or facets 46 in lieu of the reflecting surfaces 45 just mentioned. Also, in this form, the peripheral edge of the body may be beveled in opposite directions as at 47.

In Figure 14 of the drawings, the reflector body 48 is of substantially dumb-bell shape in cross section to provide outwardly disposed convex reflecting surfaces 49 and centrally disposed concaved reflecting surfaces 50.

Whereas I have illustrated in all of the preceding forms, the reflector elements as being circular in side elevation, they may be square as shown in Figure 15, octagonal as shown in Figure 16, oval as shown in Figure 17, or they may have a circular corrugated periphery as shown in Figure 18, or a circular saw toothed periphery as shown in Figure 19.

It will be understood that the bodies of the modifications shown in Figures 12 to 19 inclusive are covered with a reflecting substance as shown in the preceding forms of the invention.

While I have shown and described what I consider to be the most practical embodiments of my invention, I wish it to be understood that such changes and alterations as come within the scope of the appended claims may be resorted to if desired.

Having thus described the invention, what I claim as new and desire to secure by Letters Patent of the United States is:

1. In a light reflector signal device, an annular disk-like body having a forwardly curved convex peripheral edge, a concavity in the front side of said body, a dome shaped portion formed on the front side of said body and disposed centrally within the cavity and having a portion thereof extending forwardly beyond the plane of the front peripheral edge of said body, and a thin covering of colored reflecting substance of uniform thickness overlying and secured to the front of the body and conforming to the shape of the surface configuration of said concavity, dome shaped portion, and said forwardly curved peripheral edge, whereby the colored reflecting surfaces may receive light rays directed at the front and peripheral edge of said body and reflect colored signal light rays therefrom.

2. A reflector signal device for use upon motor vehicles comprising an annular disk-like body having a flat rear surface and a forwardly curved convex peripheral edge, a concavity in the front side of said body, a dome shaped portion formed on the front side of said body and disposed centrally within the concavity and having a portion thereof extending forwardly beyond the plane of the front peripheral edge of said body, a thin covering of colored reflecting substance of uniform thickness overlying and secured to the front concave surface, dome shaped surface and forwardly curved peripheral edge and conforming to the shape of the surface configuration thereof whereby the colored reflecting surfaces may receive light rays directed at the front and peripheral edges of the body and reflect colored signal light rays therefrom, and attaching means carried by the flat rear surface of said body to effect an attachment of the device to a motor vehicle.

ALEXANDER C. DE HOFFMANN.